United States Patent [19]
Kuo

[11] Patent Number: 5,960,913
[45] Date of Patent: Oct. 5, 1999

[54] DEVICE FOR ADJUSTING THE BRAKE PAD RELATIVE TO THE WHEEL RIM OF A BICYCLE

[76] Inventor: Yung-Pin Kuo, No.55, Alley 121, Lane 175, Kuo Shen Rd., Chang Hwa City, Taiwan

[21] Appl. No.: 09/245,837

[22] Filed: Feb. 8, 1999

[51] Int. Cl.$^6$ ...................................................... B62L 1/06
[52] U.S. Cl. .................................... 188/24.19; 188/24.12
[58] Field of Search ............................ 188/24.11, 24.12, 188/24.14, 24.19, 24.21, 24.22

[56] References Cited

U.S. PATENT DOCUMENTS

| | | | |
|---|---|---|---|
| 5,626,209 | 5/1997 | Viola | 188/24.14 |
| 5,775,466 | 7/1998 | Banvas et al. | 188/24.21 |
| 5,788,020 | 8/1998 | Tsang | 188/24.12 |
| 5,853,069 | 12/1998 | Lee et al. | 188/24.19 |

*Primary Examiner*—Chris Schwartz
*Attorney, Agent, or Firm*—Rosenberg, Klein & Bilker

[57] ABSTRACT

A brake caliper assembly includes a brake caliper pivotally mounted to a shaft extending from the front fork of a bicycle, a cam member fixedly received in the frame portion of the caliper and fixedly mounted to the shaft. A pushing member is pivotally received in the frame portion with the lower end engaged with the cam member. A supporting member is biasedly connected to the brake caliper and the brake pad is fixedly connected to the supporting member. The rear side of the supporting member contacts the upper end of the pushing member. A bolt threadedly extends through the bottom of the frame portion so as to contact the cam member so that when rotating the bolt the caliper is pivoted about the shaft and the supporting member is pushed and pivoted by the pushing member which is pivoted by the cam member.

8 Claims, 7 Drawing Sheets

DEVICE FOR ADJUSTING THE BRAKE PAD RELATIVE TO THE WHEEL RIM OF A BICYCLE

FIELD OF THE INVENTION

The present invention relates to a brake caliper assembly for a bicycle, and more particularly, to a brake caliper assembly whose brake pad is angle-adjustable relative to the wheel rim of the bicycle.

BACKGROUND OF THE INVENTION

A conventional brake system for a front wheel of a bicycle is connected to the two extensions 10 of the front fork of the bicycle wherein each of the extensions 10 has a protrusion 11 extending therefrom so as to respectively engaged with the brake caliper 20 of the brake system. Each of the brake calipers 20 has a brake pad 21 attached thereto so that when pulling the brake cable 22, the two brake calipers 20 are pivoted toward the wheel rim (not shown) so as to stop the wheel by the brake pads 21 contacting the rim. Because the outside of the wheel rim is a tapered surface so that when the contact surface of the brake pad 21 contacts the wheel rim, the top edge bears a large pressure and the lower edge of the contact surface of the brake pad 21 bear a small pressure. Therefore, the contact surface of the brake pad 21 will be worn to be an inclined surface. Generally, the brake pad 21 can be adjusted along a vertical direction relative to the wheel rim, the angle of the contact surface of the brake pad 21 relative to the wheel rim cannot be adjusted according to the practical needs. Furthermore, the calipers 20 are opened wide outwardly by a torsion spring 22 connected to the lower end of the caliper 20 and the torsion spring 22 is adjusted by using a spanner to rotate the hexagonal head 23 of the adjusting bolt as shown. However, it is inconvenient for the riders to carry a spanner with him/her.

The present invention intends to provide a brake caliper whose brake pad is angle adjustable relative to the wheel rim so that the brake pad can be maintained as being worn evenly when contacting the wheel rim.

SUMMARY OF THE INVENTION

In accordance with one aspect of the present invention, there is provided a brake caliper assembly comprising a brake caliper comprising a frame portion and a head portion extending from the top of the frame portion. The frame portion has two side walls with a bottom connected therebetween and each of the side walls has an aperture defined therethrough for a shaft extending through the two apertures. A supporting member has a brake pad connected thereto and a lug extending from a side thereof which is pivotally received between the two side walls of the frame portion. A cam member is fixedly mounted to the shaft and received in the frame portion. A pushing member is pivotally received between the two side walls of the frame portion and has the first end thereof contacting the cam member and the second end thereof contacting the supporting member. An actuating means is connected to the frame portion and contacts the cam member so that the supporting member is pivoted by the pushing member which is pivoted by the cam member when the actuating means is operated.

The main object of the present invention is to provide a brake caliper assembly wherein the angle of the contact surface of brake pad can be adjusted relative to the wheel rim.

Further features of the present invention will become apparent after a careful reading of the detailed description with appropriate reference to the accompanying drawings.

DETAILED DESCRIPTION OF THE PREFERRED EMBODIMENTS

Figure 1:
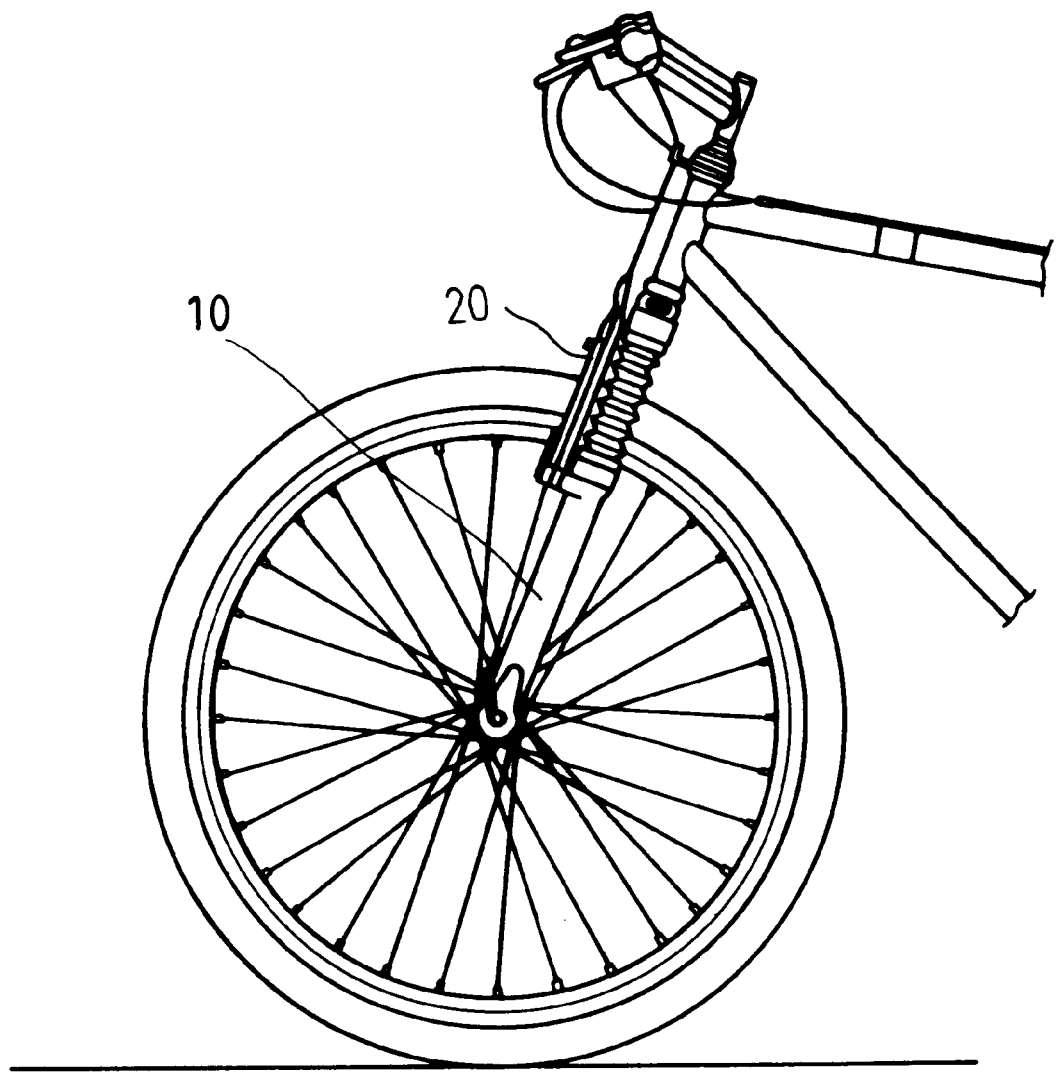
FIG. 1 is an illustrative view to show a bicycle and the brake caliper system of the present invention.
Figure 2:
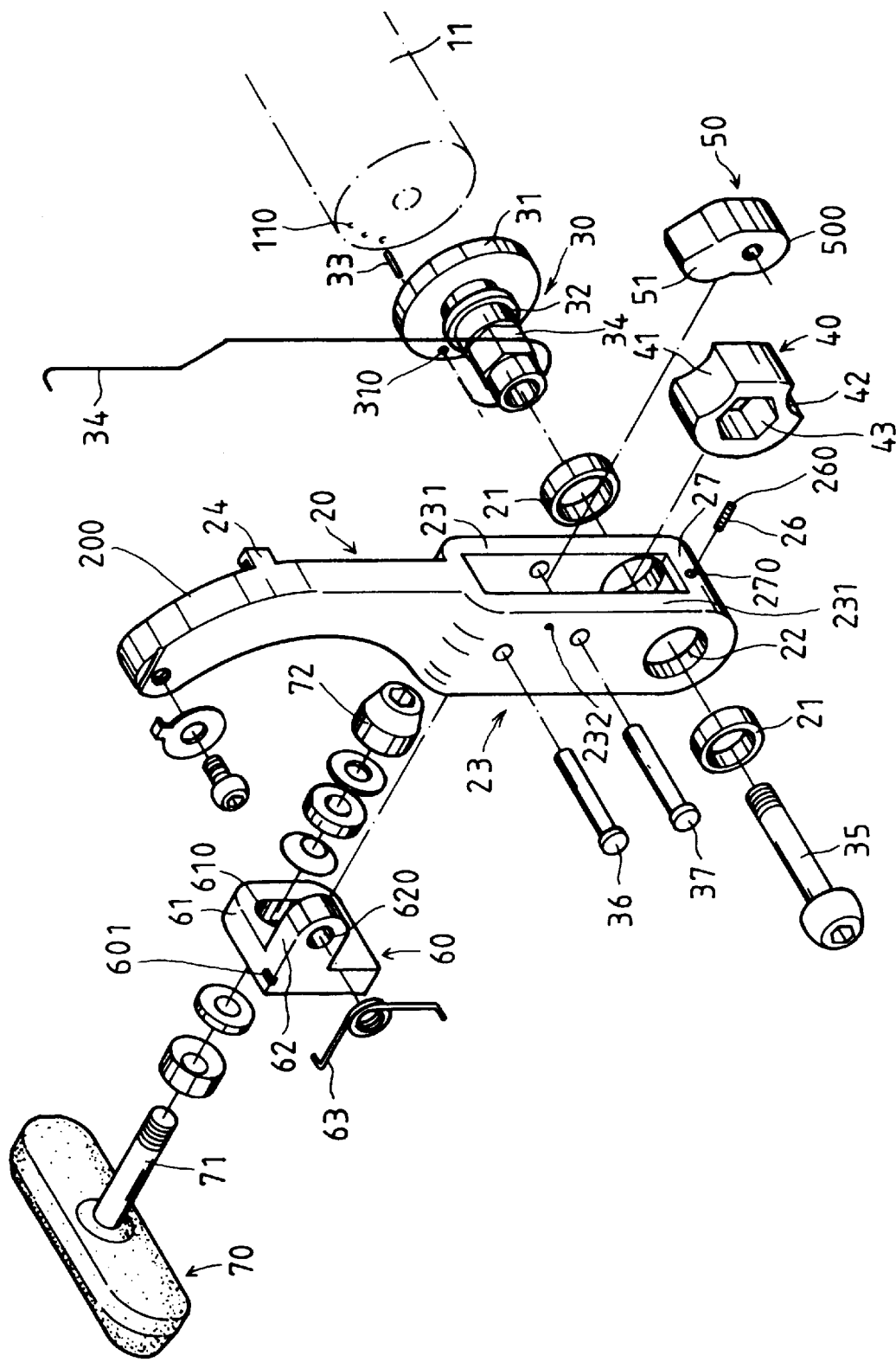
FIG. 2 is an exploded view of the brake caliper assembly in accordance with the present invention.
Figure 3:
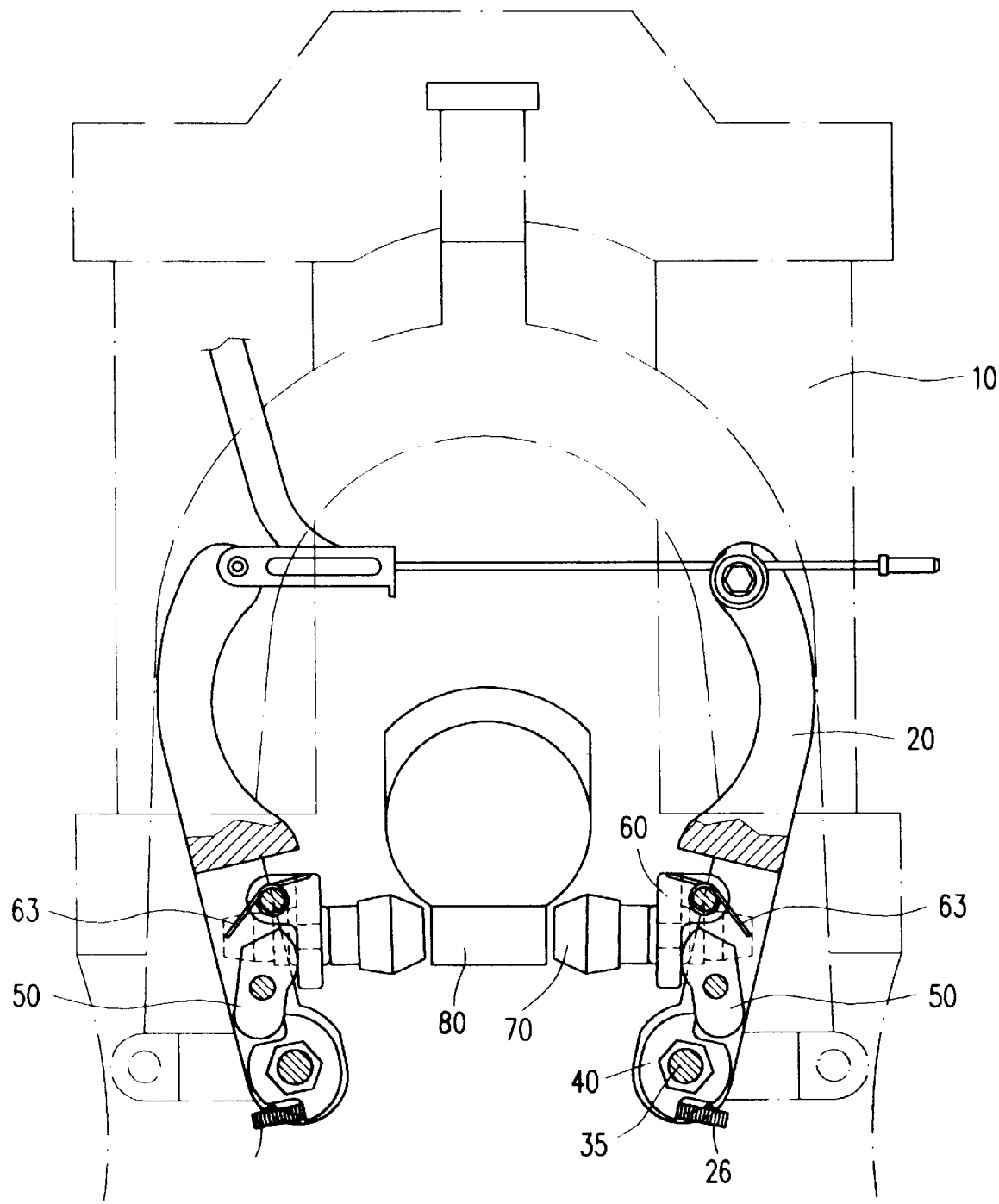
FIG. 3 is a front elevational view, partly in section, of the brake caliper assembly in accordance with the present invention.
Figure 4:
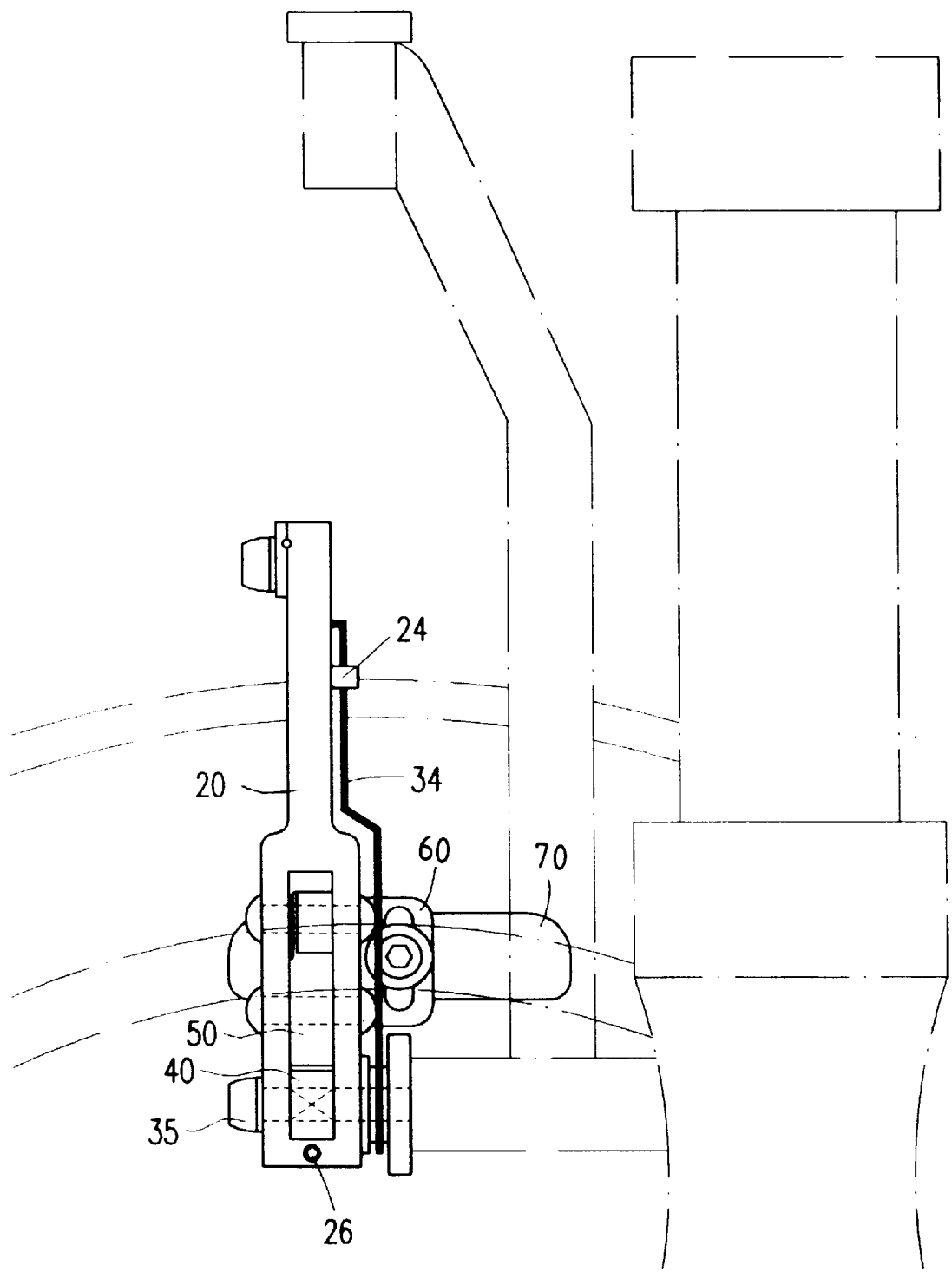
FIG. 4 is a side elevational view of the brake caliper assembly in accordance with the present invention.
Figure 7:
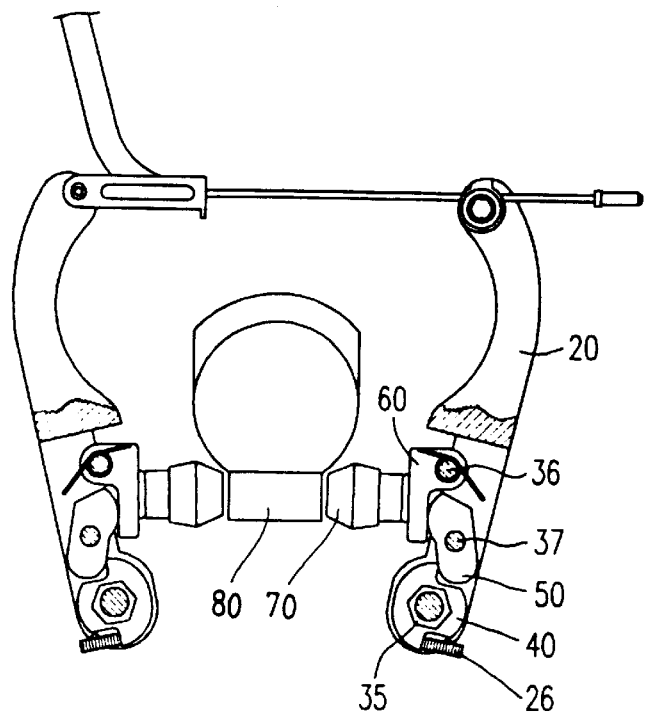
FIG. 7 is a front elevational view, partly in section, of the brake caliper assembly connected to the front fork of the bicycle and the wheel rim.

Referring to FIGS. 1 to 4 and 5, the brake caliper assembly for a bicycle in accordance with the present invention comprises a brake caliper 20 including a frame portion 23 and a head portion 200 extending from the top of the frame portion 23, the frame portion 23 having two side walls 231 with a bottom 27 connected between the two side walls 231 so as to defined a through passage between the two side walls 231. The bottom 27 of the frame portion 23 has a threaded passage 270 defined therethrough. Each of the side walls 231 has an aperture 22 defined therethrough for two bushes 21 respectively engaged therewith. A shaft 30 has a disk 31 extending from one of two ends thereof and a positioning holes 310 is defined through the disk 31. A bolt 35 extends through the shaft 30 and is threadedly with the protrusion 11 to securely connect the shaft 30 to the protrusion 11. A pin 33 is connected between one of the holes 110 defined in the end surface of the protrusion 11 and the rear side of the disk 31. The shaft 30 has a hexagonal section 34 and two smooth sections 32 which are respectively engaged with the two bushings 21 when the shaft 30 extends through the two apertures 22 of the two side walls 231 such that the brake caliper 20 is able to rotate relative to the shaft 30. A biasing member 34 has one end thereof inserted into the positioning hole 310 of the disk 31 and the other end of the biasing member 34 is engaged with a hook 24 extending laterally from the head portion 200 of the caliper 20 so as to maintain a distance between the brake caliper 20 and the wheel rim 80 as shown in FIGS. 3 and 7.

A supporting member 60 has a lug 62 extending from a side thereof and a slot 610 defined through the supporting member 60. A brake pad 70 has a rod 71 extending therefrom which extends through the slot 610 and the through passage between the two side walls 231 of the frame portion 23, and is secured to the supporting member 60 and the frame portion 23 by a nut 72. A pin 36 extends through the two side walls 231 and the hole 620 defined in the lug 62 to let the supporting member 60 be pivotally received between the two side walls 231 of the frame portion 23. The supporting member 60 has a notch 601 defined in the outside thereof and one of the two side walls 231 has a hole 232 defined therethrough so that a torsion spring 63 is connected between the notch 601 and the hole 232.

A cam member 40 has a hexagonal hole 43 defined therethrough so that the hexagonal section 34 is securely engaged with the hexagonal hole 43 of the cam member 40 between the two side walls 231 of the frame portion 23. The cam member 40 has a first convex portion 41 on the top thereof and a second convex portion 42 on the bottom of the cam member 40.

A pushing member 50 is pivotally received between the two side walls 231 of the frame portion 23 by extending a pin 37 through the two side walls 231 and the pushing member 50. The pushing member 50 had the first end 500 thereof contacting the first convex portion 41 of the cam member 40 and the second end 51 thereof contacting the rear side of the supporting member 60.

An actuating means, an adjusting bolt 26 in this embodiment, threadedly extends through the threaded passage 270 of the frame portion 23 and contacts the second convex portion 42 of the cam member 40.

Figure 6:
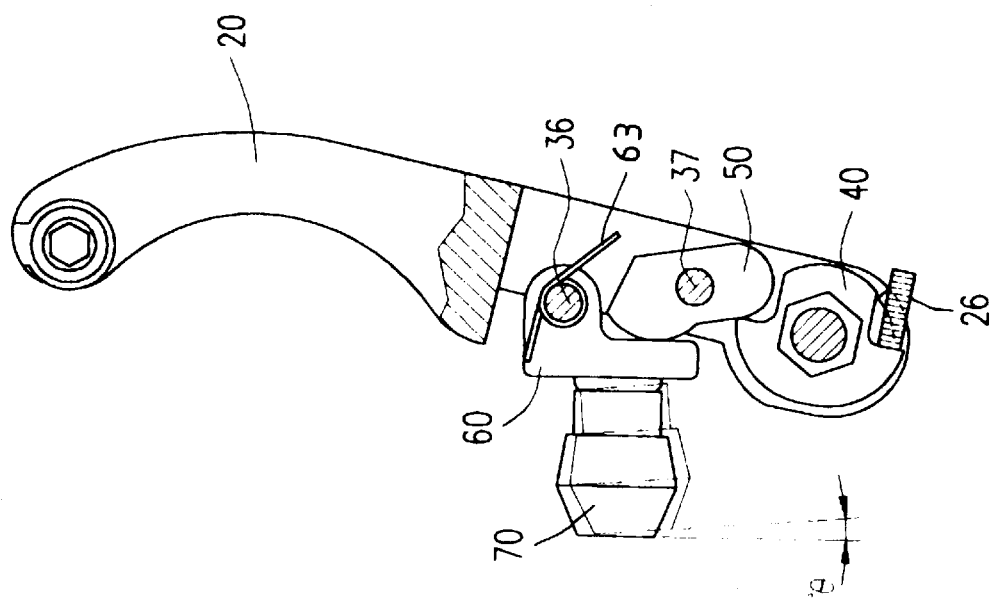
FIG. 6 is a side elevational view, partly in section, of the brake caliper in accordance with the present invention, wherein the brake pad is pivoted.
Figure 5:
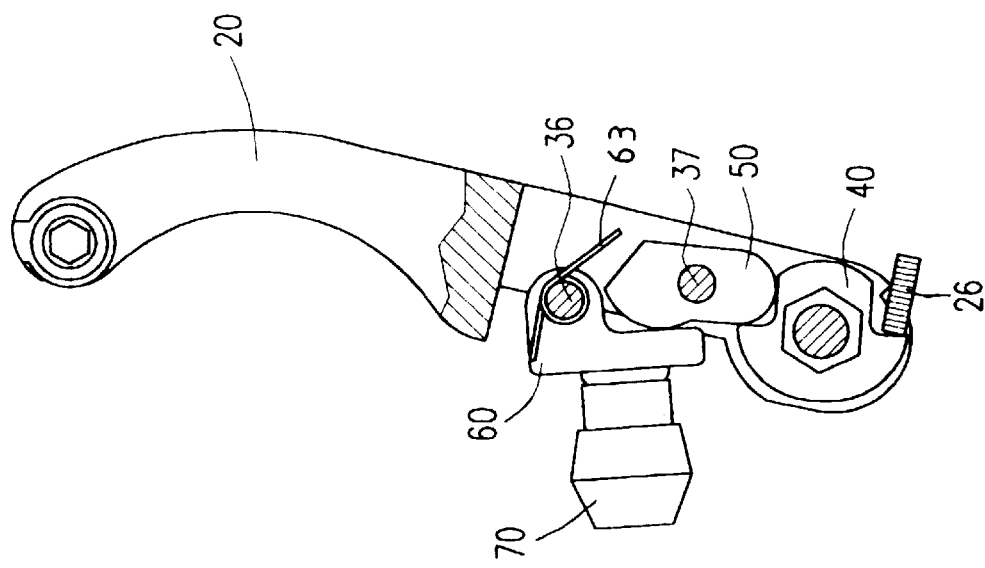
FIG. 5 is a side elevational view, partly in section, of the brake caliper in accordance with the present invention.
Figure 8:
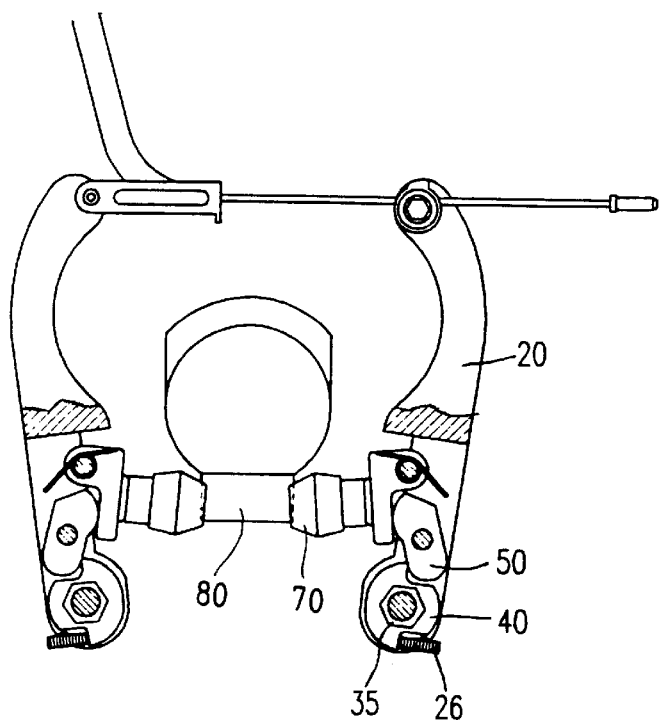
FIG. 8 is a front elevational view, partly in section, of the brake caliper assembly which is operated to clamp the wheel rim.
Figure 9:
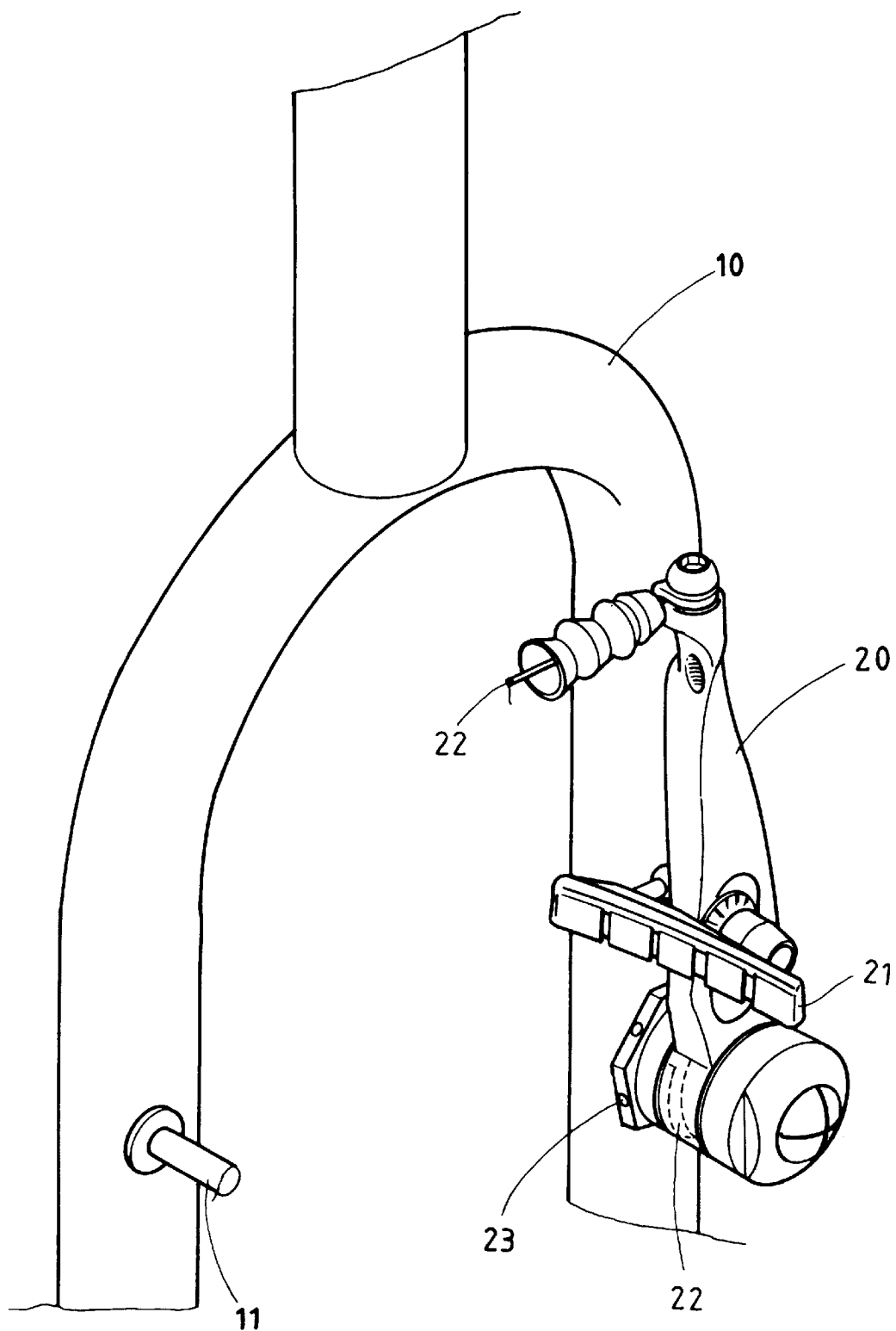
FIG. 9 is a perspective view of the conventional brake caliper assembly attached to the front fork of a bicycle.

Referring to FIGS. 6 and 8, when threadedly forwarding the adjusting bolt 26 toward the cam member 40, the adjusting bolt 26 applies a force to the second convex portion 42, however, the cam member 40 is fixedly mounted to the shaft 30 so that the brake caliper 20 will be pivoted about the shaft 30, the supporting member 60 is therefore pivoted about the pin 36 by the second end 51 of the pushing member 50 which is pivoted because the second end 500 of the pushing member 50 contacts the first convex portion 41 of the cam member 40. By this way, the contact surface of the brake pad 70 can be adjusted an angle of θ relative to the wheel rim 80.

The present invention provides a convenient and useful function which allows the user to rotate the adjusting bolt 26 to adjust the angle of the contact surface of the brake pad 70 relative to the wheel rim 80.

It is to be understood that the above description and drawings are only used for illustrating some embodiments of the present invention, not intended to limit the scope thereof. Any variation and derivation from the above description and drawings should be included in the scope of the present invention.

What is claimed is:

1. A brake caliper assembly for a bicycle having a front fork, comprising:

a brake caliper including a frame portion and a head portion extending from the top of said frame portion, said frame portion having two side walls with a bottom connected between said two side walls, each of said side walls having an aperture defined therethrough, a shaft adapted to be fixedly connected to the front fork and extending through said two apertures of said two side walls;

a supporting member having a brake pad connected thereto, a lug extending from a side of said supporting member and pivotally received between said two side walls of said frame portion;

a cam member fixedly mounted to said shaft and located between said two side walls of said frame portion;

a pushing member pivotally received between said two side walls of said frame portion, said pushing member having the first end thereof contacting said cam member and the second end thereof contacting said supporting member, and an actuating means connected to said frame portion and contacting said cam member so that said supporting member is pivoted by said pushing member which is pivoted by said cam member when said actuating means is operated.

2. The brake caliper assembly as claimed in claim 1, wherein said bottom of said frame portion has a threaded passage defined therethrough and said actuating means threadedly extends therethrough and contacts said cam member.

3. The brake caliper assembly as claimed in claim 1, wherein said shaft has a hexagonal section and said cam member has a hexagonal hole defined therethrough so that said hexagonal section is securely engaged with said hexagonal section.

4. The brake caliper assembly as claimed in claim 1, wherein said cam member has a first convex portion on the top thereof and a second convex portion on the bottom of said cam member, said first end of said pushing member contacting said first convex portion and said actuating means engaged with said second convex portion.

5. The brake caliper assembly as claimed in claim 1 further comprising two bushings engaged with said two apertures of said two side walls, said shaft having two smooth sections respectively engaged with said two bushings so that said brake caliper is rotated relative to said shaft.

6. The brake caliper assembly as claimed in claim 1, wherein said supporting member has a notch defined in the outside thereof and one of said two side walls has a hole defined therethrough so that a torsion spring is connected between said notch and said hole.

7. The brake caliper assembly as claimed in claim 1 further comprising a slot defined through said supporting member, said brake pad having a rod extending therefrom which extends through said slot and secured to said supporting member by a nut.

8. The brake caliper assembly as claimed in claim 1 further comprising a biasing member connected between said shaft and said head portion of said caliper.

* * * * *